(12) United States Patent
Han et al.

(10) Patent No.: US 7,894,017 B2
(45) Date of Patent: Feb. 22, 2011

(54) PLANE LIGHT SOURCE AND LCD BACKLIGHT UNIT HAVING THE SAME

(75) Inventors: Seong Yeon Han, Gwangju (KR); Hun Joo Hahm, Gyunggi-do (KR); Hyung Suk Kim, Gyunggi-do (KR); Young June Jeong, Seoul (KR); Young Sam Park, Seoul (KR); Chul Hee Yoo, Gyunggi-do (KR)

(73) Assignee: Samsung LED Co., Ltd., Suwon-si (KR)

( * ) Notice: Subject to any disclaimer, the term of this patent is extended or adjusted under 35 U.S.C. 154(b) by 137 days.

(21) Appl. No.: 12/199,327

(22) Filed: Aug. 27, 2008

(65) Prior Publication Data
US 2009/0059123 A1  Mar. 5, 2009

(30) Foreign Application Priority Data
Aug. 30, 2007  (KR) ............... 10-2007-0087401

(51) Int. Cl.
*G02F 1/1335* (2006.01)
(52) U.S. Cl. ............................ 349/69; 349/64
(58) Field of Classification Search ............ 349/69, 349/64
See application file for complete search history.

(56) References Cited

U.S. PATENT DOCUMENTS

| | | | | |
|---|---|---|---|---|
| 4,845,525 A * | 7/1989 | Ito | ................. | 399/2 |
| 5,969,850 A * | 10/1999 | Harrold et al. | ............. | 359/320 |
| 6,188,382 B1 * | 2/2001 | Okamura et al. | ............. | 345/669 |
| 6,404,131 B1 * | 6/2002 | Kawano et al. | ............. | 315/82 |
| 6,550,949 B1 * | 4/2003 | Bauer et al. | ................ | 362/545 |
| 7,095,406 B2 * | 8/2006 | Kim | ............. | 345/206 |
| 7,186,004 B2 * | 3/2007 | Powell et al. | ............. | 362/244 |
| 7,643,048 B2 * | 1/2010 | Chino et al. | ............. | 347/239 |
| 2003/0128399 A1 * | 7/2003 | Chino et al. | ............. | 358/296 |
| 2004/0156130 A1 * | 8/2004 | Powell et al. | ............. | 359/845 |
| 2004/0218388 A1 * | 11/2004 | Suzuki | ............. | 362/231 |
| 2005/0181597 A1 * | 8/2005 | Yanagisawa et al. | ........ | 438/640 |
| 2005/0242362 A1 * | 11/2005 | Shimizu et al. | ............. | 257/99 |
| 2006/0203338 A1 * | 9/2006 | Pezzaniti | ............. | 359/465 |
| 2007/0187708 A1 * | 8/2007 | Setomoto et al. | ............. | 257/99 |
| 2008/0043092 A1 * | 2/2008 | Evans et al. | ............. | 348/36 |
| 2008/0186273 A1 * | 8/2008 | Krijn et al. | ............. | 345/102 |

\* cited by examiner

*Primary Examiner*—K. Cyrus Kianni
(74) *Attorney, Agent, or Firm*—Sughrue Mion, PLLC

(57) ABSTRACT

There are provided a plane light source and an LCD backlight unit having the same. A plane light source including light emitting device matrixes each having a plurality of light emitting devices arranged in rows and columns on a substrate according to an aspect of the invention includes: a first matrix having a plurality of light emitting devices arranged in rows and columns; and a second matrix having a plurality of light emitting devices arranged in rows and columns, the light emitting devices each located within a rectangle formed by four adjacent light emitting devices included in the first matrix, and forming angles θ satisfying the condition of $45° \leq \theta \leq 55°$ therebetween on the basis of a horizontal direction, wherein among pitches between one light emitting devices included in the light emitting device matrixes and another lighting light emitting device adjacent to the light emitting device, a pitch P1 between the light emitting device and the light emitting device diagonally across from the light emitting device satisfies the condition of $25\ mm \leq P1 \leq 29\ mm$, and a pitch P2 between the light emitting device and another light emitting device located in a horizontal direction satisfies the condition of $34\ mm \leq P2 \leq 38\ mm$.

5 Claims, 4 Drawing Sheets

PLANE LIGHT SOURCE AND LCD BACKLIGHT UNIT HAVING THE SAME

CROSS-REFERENCE TO RELATED APPLICATIONS

This application claims the priority of Korean Patent Application No. 2007-0087401 filed on Aug. 30, 2007, in the Korean Intellectual Property Office, the disclosure of which is incorporated herein by reference.

BACKGROUND OF THE INVENTION

1. Field of the Invention

The present invention relates to plane light sources and LCD backlight units having the same, and more particularly, to a plane light source that has high efficiency and can reduce the number of light emitting devices by optimizing the arrangement and pitch of the light emitting devices, and an LCD backlight unit having the same.

2. Description of the Related Art

In general, when a current is applied to a semiconductor light emitting diode (LED), the semiconductor LED can generate light of various colors by recombination of electrons and holes in a p-n junction between p-type and n-type semiconductors. When compared with a filament-based light emitting device, the LED has a longer lifespan, lower power consumption, excellent initial driving characteristics, higher vibration resistance, and higher tolerance for repetitive power switching. Thus, there has been an increasing demand for LEDs. Nowadays, group III nitride semiconductors that can emit light in a short-wavelength region, including blue, have attracted attention.

In the related art, since a cold cathode fluorescent lamp (CCFL), which is used as a light source for an LCD backlight unit, uses mercury gas, environmental contamination may be caused. Furthermore, the CCFL has low response speed and low color reproducibility, and may not allow a reduction in size, thickness, and weight of an LCD panel.

Compared to the CCFL, a light emitting diode (LED) is environment-friendly, has a response speed of several nanoseconds to achieve high-speed response and be effective for a video signal stream, and allows impulsive driving. Further, the LED has a color reproducibility of 100% or more, varies in luminance, color temperature, and the like by controlling the intensity of light of the red, green, and blue LEDs, and can result in a reduction in size, thickness, and weight of the LCD panel. Accordingly, the LED has been widely used as a light source for the backlight unit of the LCD panel or the like.

An LCD backlight using an LED may be divided into an edge type backlight and a direct type backlight according to the position of a light source. In a case of the edge type backlight, a bar-shaped light source having a width larger than its length is positioned at the side thereof and emits light onto a front surface of the LCD panel by using a light guide panel. In a case of the direct type backlight, a plane light source is positioned at a lower part of the LCD panel, and light is directly irradiated onto a front surface of the LCD panel from the plane light source that has almost the same area as the LCD panel.

FIG. 1 is a view illustrating the arrangement of light emitting devices of a plane light source according to the related art.

As shown in FIG. 1, according to the related art, a plane light source 100 that is used in a direct type LCD panel includes a plurality of LEDs 102 that are arranged in rows and columns on a substrate 101. In this case, each four adjacent LEDs 102 of the plurality of LEDs 102 form a rectangle.

In the plane light source 100, the substrate 101 is divided into eight blocks. Eighteen LEDs 102 are arranged in each block, and thus, one hundred forty four LEDs 102 are included in the entire substrate 101. Here, as shown in FIG. 1, the entire substrate 101 is 453×124 mm.

However, the above arrangement requires a larger number of LEDs that are used to cover the same light emitting area than necessary.

Further, an area adjacent to the LEDs 102 has much higher brightness than an area distant from the LEDs 102, that is, the center of the rectangle formed by the four LEDs 102. That is, when a large number of LEDs 102 are arranged, a uniformity of brightness can be achieved. However, when the number of LEDs is reduced to improve the efficiency as described above, the pitch between the neighboring LEDs becomes larger. Thus, a variation may occur in brightness distribution.

Therefore, in terms of a plane light source used in the LCD panel or the like, there is a need for a method of improving the efficiency of the plane light source by reducing the number of light emitting devices used in the plane light source, and achieving the uniformity of luminance, that is, little difference in brightness.

SUMMARY OF THE INVENTION

An aspect of the present invention provides a plane light source that has high efficiency and can reduce the number of a plurality of light emitting devices by optimizing the arrangement and pitch of the light emitting devices, and an LCD backlight unit having the same.

According to an aspect of the present invention, there is provided a plane light source including light emitting device matrixes each having a plurality of light emitting devices arranged in rows and columns on a substrate, the plane light source comprising: a first matrix having a plurality of light emitting devices arranged in rows and columns; and a second matrix having a plurality of light emitting devices arranged in rows and columns, the light emitting devices each located within a rectangle formed by four adjacent light emitting devices included in the first matrix, and forming angles θ satisfying the condition of 45°≦θ≦55° therebetween on the basis of a horizontal direction, wherein among pitches between one light emitting devices included in the light emitting device matrixes and another lighting light emitting device adjacent to the light emitting device, a pitch P1 between the light emitting device and the light emitting device diagonally across from the light emitting device satisfies the condition of 25mm≦P1≦29 mm, and a pitch P2 between the light emitting device and another light emitting device located in a horizontal direction satisfies the condition of 34 mm≦P2≦38 mm.

Each of the light emitting devices included in the second matrix may be located at the center of the rectangle.

The light emitting device may emit white light.

The plane light source may further include a diffusion sheet disposed along a light emission path of the light emitting devices.

The light emitting device may be a light emitting diode (LED).

According to another aspect of the present invention, there is provided an LCD backlight unit attached to a rear surface of an LCD panel, the LCD backlight unit including: the plane light source; a diffusion sheet located above the plane light source and uniformly diffusing light incident from the plane light source; and at least one light collecting sheet located above the diffusion sheet and collecting light diffused by the diffusion sheet in a direction perpendicular to the plane of the LCD panel.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
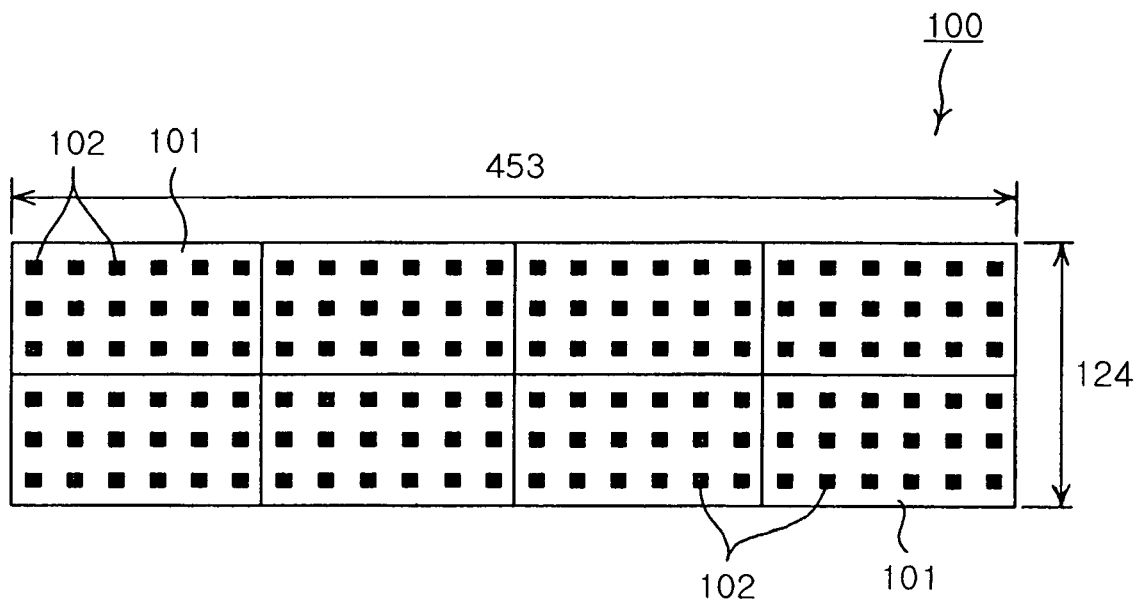
FIG. 1 is a schematic view illustrating the arrangement of light emitting devices of a plane light source according to the related art.

Exemplary embodiments of the present invention will now be described in detail with reference to the accompanying drawings.

The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Figure 2:
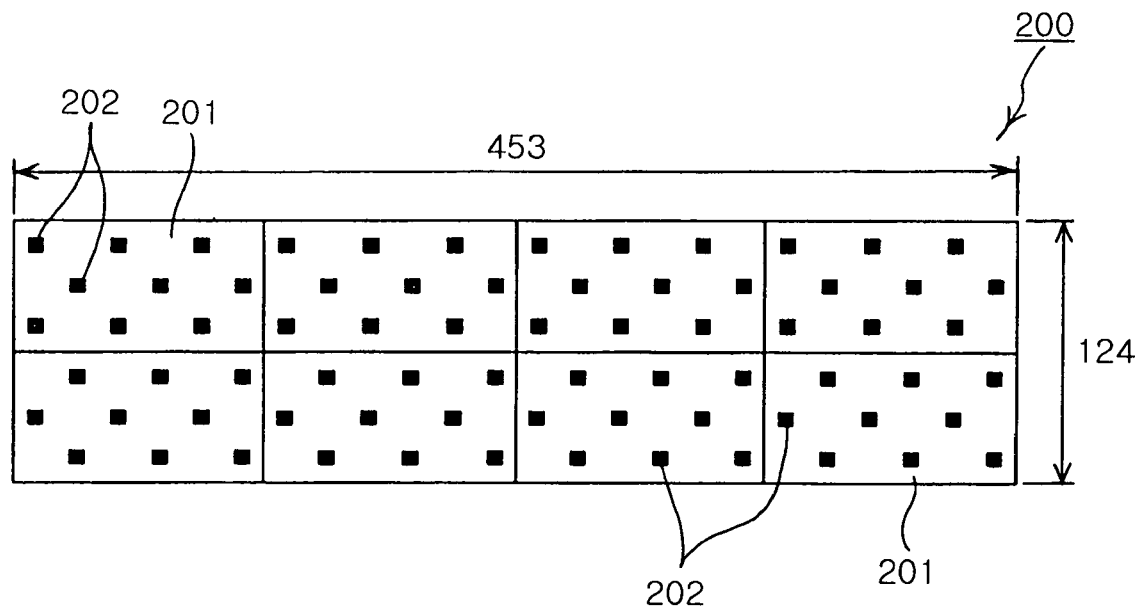
FIG. 2 is a schematic view illustrating the arrangement of light emitting devices of a plane light source according to an exemplary embodiment of the invention.

FIG. 2 is a schematic view illustrating the arrangement of light emitting devices of a plane light source according to an exemplary embodiment of the invention.

A plane light source 200 according to this embodiment includes a plurality of light emitting devices 202 that are arranged on a substrate 201.

As shown in FIG. 2, the light emitting devices 202 are arranged in a matrix having rows and columns in a zigzag manner. A first matrix includes a plurality of light emitting devices that are arranged in rows and columns in a straight line. A second matrix having the same configuration as the first matrix is located within the first matrix. That is, each of the light emitting devices of the second matrix is located within a rectangle formed by each four light emitting devices included in the first matrix.

Like the general plane light source, shown in FIG. 1, the plane light source 200 according to this embodiment includes eight blocks. A substrate 201 is 153×124 mm.

As shown in FIG. 2, each block has nine light emitting devices 202, and thus, seventy two light emitting devices 202 are arranged on the substrate 201. Compared to the plane light source, shown in FIG. 1, which includes the one hundred forty four light emitting devices, the plane light source according to this embodiment can reduce the number of light emitting devices by approximately 50%. Therefore, manufacturing costs can be remarkably reduced.

However, in this embodiment, even though the number of light emitting devices is reduced, a reduction in luminance can be prevented since the arrangement of the light emitting devices 202 is optimized. This will be described below with reference to FIG. 5.

The arrangement of light emitting devices according to this embodiment will be described in detail with reference to FIG. 3.

Figure 3:
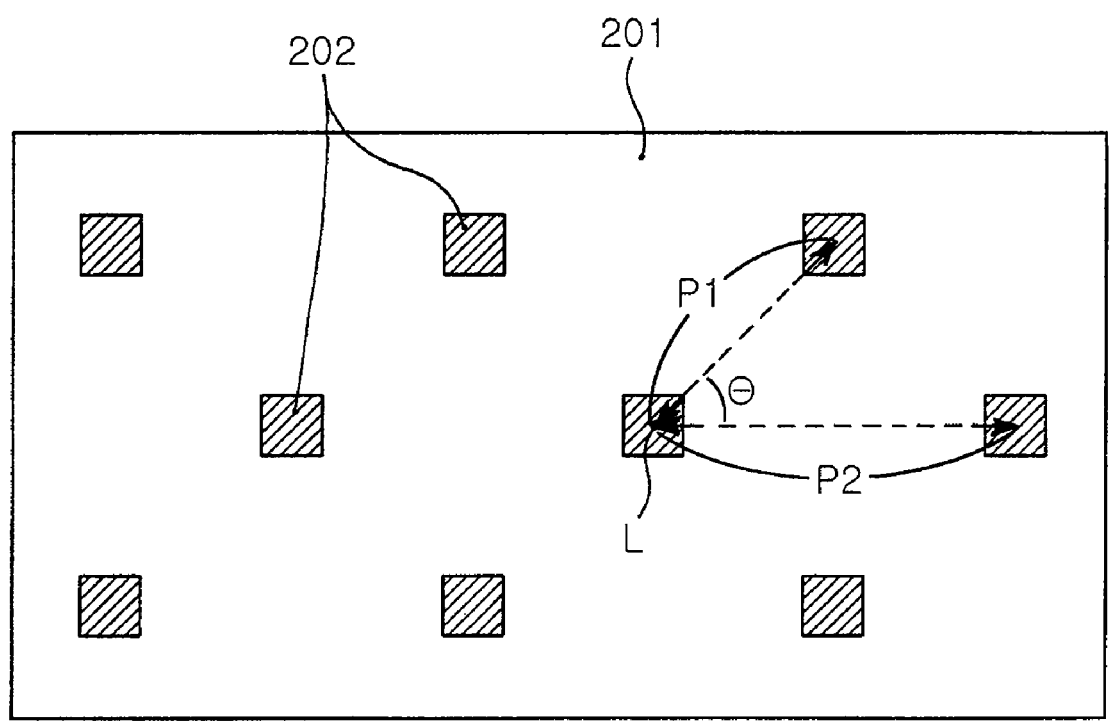
FIG. 3 is an enlargement view illustrating one block in the plane light source, shown in FIG. 2.

FIG. 3 is an enlarged view illustrating one block of the plane light source according to the related art, shown in FIG. 2.

In this embodiment, each of the light emitting devices included in the second matrix meets the four light emitting devices of the first matrix at angles of θ, where the angles θ satisfy the condition of $45° \leq θ \leq 55°$. As a result, in the zigzag arrangement, a position of each of the light emitting devices arranged within a rectangle formed by the four light emitting devices is balanced with respect to positions of the four light emitting devices. Therefore, compared to the checkered arrangement of the light emitting devices in the related art, the uniformity of luminance distribution can be improved in this embodiment, which will be described in detail below.

In this embodiment, in addition to the angles between the light emitting devices, a pitch P1 between the adjacent light emitting devices 202 and a pitch P2 between the adjacent light emitting devices 202 are optimized to ensure the uniformity of luminance of the plane light source 200.

That is, in this embodiment, among the neighboring light emitting devices 202, the pitch P1 between the light emitting device 202 and the light emitting device 202 diagonally across from it satisfies the condition of $25 \text{ mm} \leq P1 \leq 29 \text{ mm}$. At the same time, among the neighboring light emitting devices 202, the pitch P2 between the light emitting devices 202 and the light emitting device 202 located in a horizontal direction satisfies the condition of $34 \text{ mm} \leq P2 \leq 38 \text{ mm}$.

When each of the pitches P1 and P2 between the light emitting devices 202 is smaller than the above pitch conditions, the luminance and the uniformity of luminance distribution can be improved, but at the same time, the number of light emitting devices used in the substrate having the same area also increases. As a result, it becomes difficult to achieve the object of the invention to reduce the number of light emitting devices and prevent the reduction of the luminance and the uniformity of luminance distribution.

On the other hand, when each of the pitches P1 and P2 between the light emitting devices is greater than the above pitch conditions, the opposite result will be obtained. That is, when the pitch P1 and the pitch P2 are greater than 29 mm and 38 mm, respectively, the number of light emitting devices can be reduced, but at the same time, the luminance and the uniformity of luminance distribution may be significantly reduced.

In this embodiment, the pitches P1 and P2 between the light emitting devices are the most important factor to be considered. Compared to the related art, when the number of light emitting devices used in the plane light source is reduced, one light emitting device is inevitably spaced apart from another light emitting device. For example, as shown in FIG. 1, in a case of the arrangement of the light emitting devices generally used, the pitch between the neighboring light emitting devices is in the range of 23.00 to 27.00 mm in width and in the range of 20.00 to 27.00 mm in height. This pitch is smaller than the pitch between the light emitting devices according to this embodiment.

As such, in the plane light source according to this embodiment, the greater pitch between the light emitting devices is, the lower luminance is. Furthermore, the uniformity of luminance distribution is also reduced since a dark portion having very low luminance may occur around the middle between the light emitting devices.

In this embodiment, the proposed numerical ranges of the pitches P1 and P2 are determined so that the number of light emitting devices can be reduced to the lowest possible number, and the reduction of luminance caused by the reduction in number of light emitting devices can be prevented.

In this embodiment, on the assumption that the angle θ is 45° on the basis of any one light emitting device L, and other light emitting devices in the horizontal direction also satisfy the condition of the angle θ, the pitches P1 and P2 can easily be determined by using trigonometric functions. For example, when the pitch P1 is 25 mm, a length approximately half of the pitch P2 corresponds to a length of each of the equal sides that form an isosceles triangle with the hypotenuse corresponding to the pitch P1. In this embodiment, the pitch P2 is approximately 35 mm.

As described above, the light emitting devices having rows and columns are not arranged in a straight line but in a zigzag manner. Therefore, the number of light emitting devices can be reduced by 15 to 50% with respect to the same light emitting area.

In general, the light emitting device 202 may be formed of an LED. However, the invention is not limited thereto. Preferably, the light emitting device 202 may be formed of a device capable of emitting white light to be widely used as a light source.

Specifically, in the light emitting device 202, blue light is emitted from an active layer that constitutes the LED, and a yellow phosphor material may be applied along a light emission path of the LED.

The plane light source can be used in an LCD backlight unit 300 that illuminates an LCD panel from the back.

Figure 4:
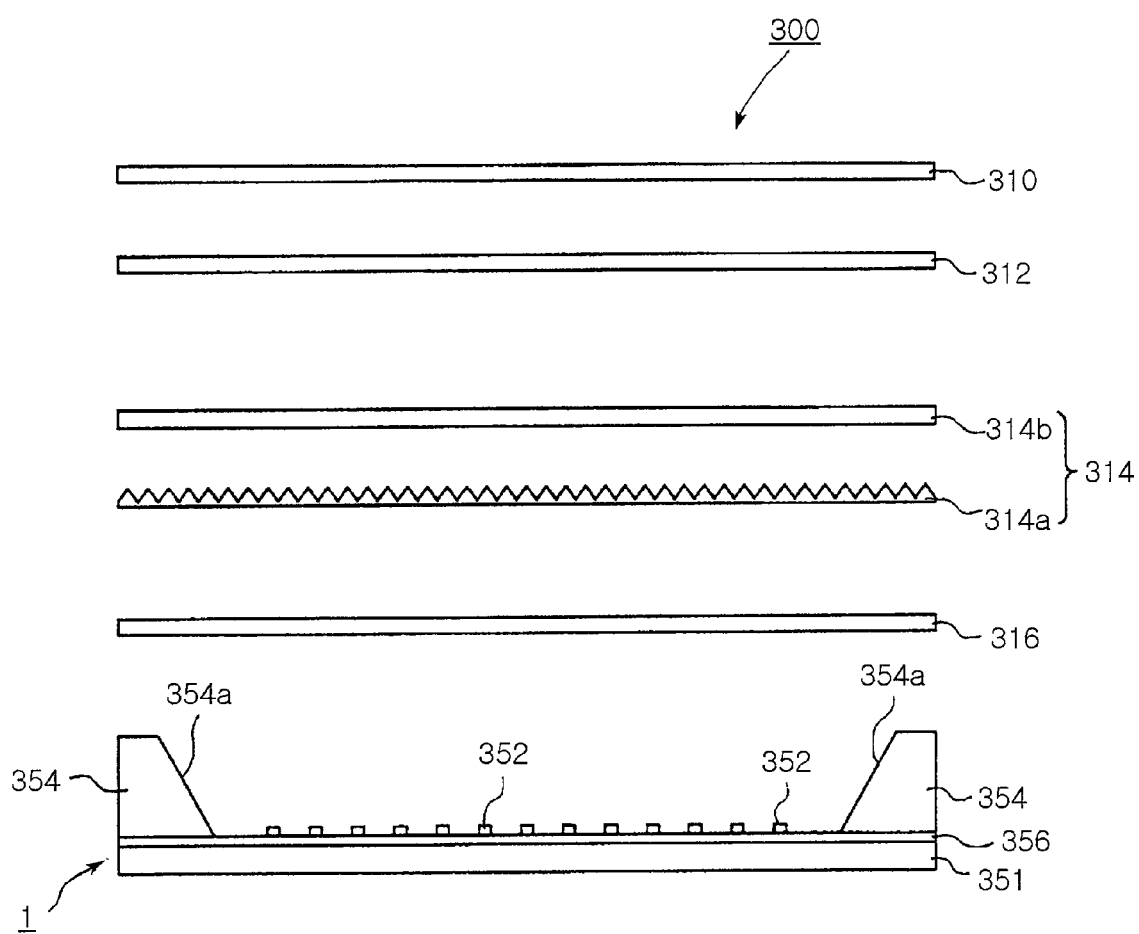
FIG. 4 is an exploded side view illustrating an LCD backlight unit according to another exemplary embodiment of the invention.

FIG. 4 is an exploded side view illustrating the LCD backlight unit 300 according to an exemplary embodiment of the invention. As shown in FIG. 4, the LCD backlight unit 300 according to this embodiment that is attached to a rear surface of the LCD panel includes the above-described plane light source 1 and a diffusion sheet 316 that is disposed above the plane light source 1 and uniformly diffuses light incident from the plane light source 1.

The LCD backlight unit 300 may also include at least one light collecting sheet 314. The light collecting sheet 314 is disposed above the diffusion sheet 316 and collects light, diffused by the diffusion sheet 316, in a direction perpendicular to the plane of the LCD panel 310. Furthermore, the LCD backlight unit 300 may include a protective sheet 312 that is disposed above the light collecting sheet 314 and protects an optical structure located below the LCD panel 310.

The plane light source 1 includes a substrate 351 and a plurality of light emitting devices 352 that are arranged in a matrix format on the substrate 351 as described in the embodiment of the invention. The plane light source 1 includes a side wall 354 and a reflective layer 356. The side wall 354 is located at the edges of an upper surface of the substrate 351, encompasses the light emitting devices 352, and has an inclined surface in a direction in which the light emitting devices 352 are arranged. The reflective layer 356 is formed on the upper surface of the substrate 351, and reflects light, emitted from the light emitting devices 252, upward.

Preferably, a reflective material 354a may also be applied to the inclined surface of the side wall 354 so that laterally emitted light can be emitted upward.

Meanwhile, the diffusion sheet 316 that is located above the plane light source 1 diffuses light incident from the plane light source 1 to prevent local concentration of light. Further, the diffusion sheet 316 controls the direction of the light moving towards the first light collecting sheet 314a to reduce an angle of inclination with respect to the first light collecting sheet 314a. In this case, as described above, the pitch between the diffusion sheet 316 and the light emitting devices 352 included in the plane light source 1 corresponds to an optical length 1 of the Equation 1. The pitch may be determined according to the arrangement of the light emitting devices 352. On the contrary, the arrangement of the light emitting devices 352 may be determined by the pitch between the light emitting devices 352 and the diffusion sheet 316.

Each of the first light collecting sheet 314a and the second light collecting sheet 314b has a predetermined arrangement of triangular prisms on an upper surface thereof. The prisms of the first light collecting sheet 314a and the prisms of the second light collecting sheet 314b cross each other at a predetermined angle (for example, 90°). Each of the first and second light collecting sheets 314a and 314b collects light diffused by the diffusion sheet 316 in a direction perpendicular to the plane of the LCD panel 310. This allows almost perfect perpendicular incidence of light, passing through the first and second light collecting sheets 314a and 314b, with respect to the protective sheet 312. Therefore, the light passing through the first and second light collecting sheets 314a and 314b mostly moves in a perpendicular direction to thereby obtain the uniform luminance distribution of the protective sheet 312. In FIG. 4, two light collecting sheets are used. However, only one light collecting sheet can be used if necessary.

The protective sheet 312 located above the second light collecting sheet 314b protects the surface of the second light collecting sheet 314b and at the same time, diffuses light to obtain the uniform distribution of light. The LCD panel 310 is installed above the protective sheet 312.

In this embodiment, the LCD backlight unit 300 uses the plane light source 1 that obtains the uniform luminance distribution of the emitted light to thereby reduce a variation in brightness that changes according to different regions of the LCD panel.

Figure 5:
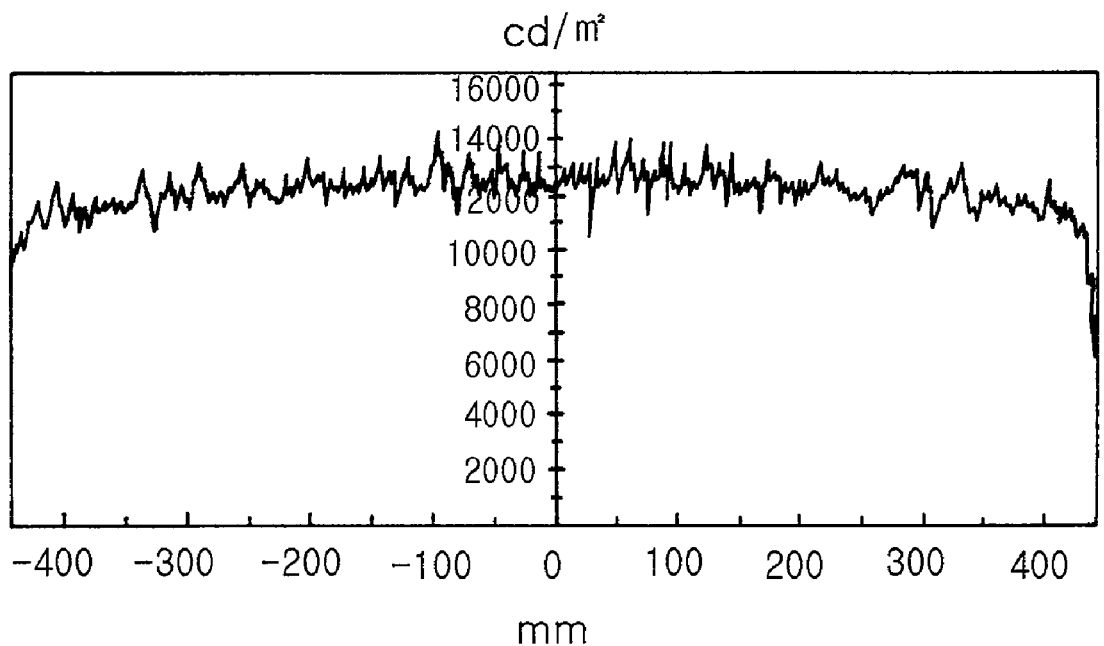
FIG. 5 is a view illustrating luminance distribution of the plane light source according to the embodiment of the invention (shown in FIG. 2) and the plane light source according to the related art (shown in FIG. 1).
Figure 5:
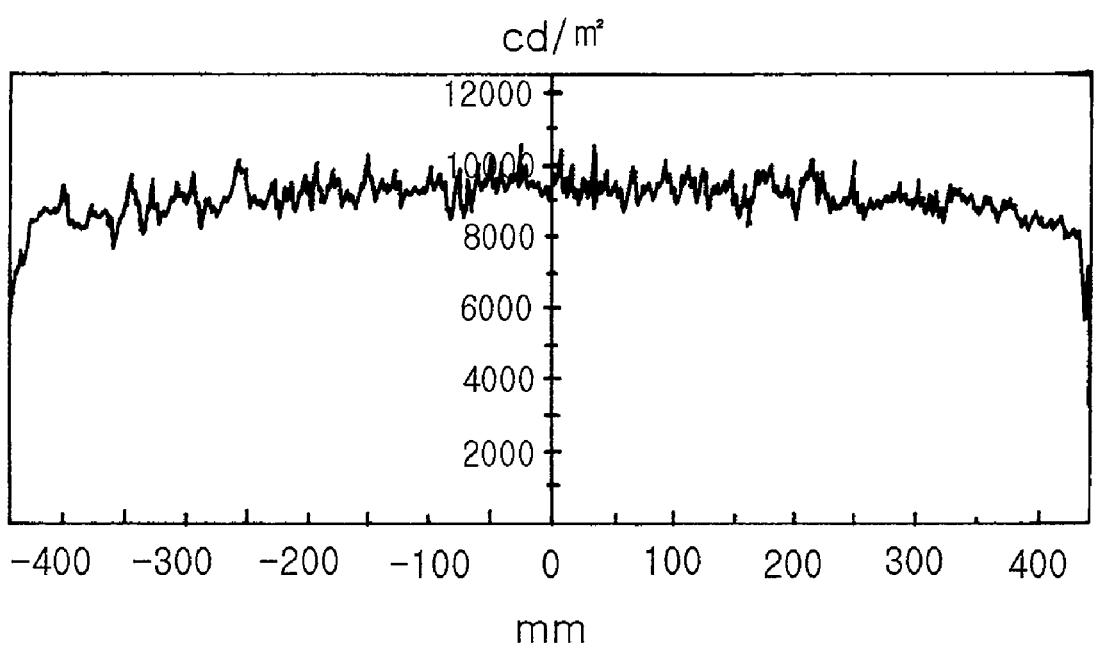

Finally, FIG. 5 is a view illustrating luminance distribution measured in the plane light source according to the embodiment of the invention (the embodiment of FIG. 2) and the plane light source according to the related art (the embodiment of FIG. 1). In FIG. 5, in order to make a comparison in luminance and uniformity of luminance distribution between the plane light sources, the plane light sources are provided in backlight units, shown in FIG. 4, and luminous characteristics thereof are shown.

In a graph shown on the upper side of FIG. 5, the luminance distribution of light emitted from the plane light source according to the related art is shown in a direction perpendicular to a light emitting direction. In a graph shown on the lower side of FIG. 5, the luminance distribution of light emitted from the plane light source according to the embodiment of the invention is shown. Here, it may be considered that a horizontal axis of each graph, shown in FIG. 5, indicates a horizontal direction of the light emitting device matrixes of the plane light source.

Referring to the two graphs, shown in FIG. 5, the plane light source is shown to have a luminance of approximately 12000 Cd/m$^2$ according to the related art, and the plane light source is shown to have a luminance of approximately 10000 Cd/m$^2$ according to the embodiment of the invention. Therefore, in comparison with the related art, the luminance of the plane light source is reduced by approximately 17%. In consideration of the above description, the number of light emitting devices arranged on the substrate is reduced, and thus it can be said that the efficiency is significantly improved compared to the related art.

Further, even though the average pitch between the light emitting devices is increased due to the reduced number of light emitting devices, as compared to the related art, the uniformity of the luminance distribution is not brought into question at all. Rather, the uniformity of the luminance distribution is improved.

As set forth above, according to the exemplary embodiments of the invention, a plane light source that has high efficiency and reduces the number of light emitting devices by optimizing the arrangement and pitch of the light emitting devices can be provided, and an LCD backlight unit having the same can also be provided. Further, according to the exemplary embodiment of the invention, the uniform luminance of the entire plane light source can be achieved.

While the present invention has been shown and described in connection with the exemplary embodiments, it will be apparent to those skilled in the art that modifications and variations can be made without departing from the spirit and scope of the invention as defined by the appended claims.

What is claimed is:

1. An LCD backlight unit comprising:
   a plane light source including light emitting device matrixes each having a plurality of light emitting devices arranged in rows and columns on a substrate, the plane light source comprising:
   a first matrix having a plurality of light emitting devices arranged in rows and columns; and
   a second matrix having a plurality of light emitting devices arranged in rows and columns, the light emitting devices each located within a rectangle formed by four adjacent light emitting devices included in the first matrix, and forming angles θ satisfying the condition of 45°≦θ≦55° therebetween on the basis of a horizontal direction,
   wherein among pitches between one light emitting devices included in the light emitting device matrixes and another lighting light emitting device adjacent to the light emitting device, a pitch P1 between the light emitting device and the light emitting device diagonally across from the light emitting device satisfies the condition of 25 mm≦P1≦29 mm, and a pitch P2 between the light emitting device and another light emitting device located in a horizontal direction satisfies the condition of 34 mm≦P2≦38 mm,
   a diffusion sheet located above the plane light source and uniformly diffusing light incident from the plane light source; and
   at least one light collecting sheet located above the diffusion sheet and collecting light diffused by the diffusion sheet in a direction perpendicular to the plane of the LCD panel.

2. The LCD backlight unit of claim 1, wherein each of the light emitting devices included in the second matrix is located at the center of the rectangle.

3. The LCD backlight unit of claim 1, wherein the light emitting device emits white light.

4. The LCD backlight unit of claim 1, further comprising a diffusion sheet disposed along a light emission path of the light emitting devices.

5. The LCD backlight unit of claim 1, wherein the light emitting device is a light emitting diode (LED).

* * * * *